(12) United States Patent
Briggs

(10) Patent No.: US 9,949,341 B1
(45) Date of Patent: Apr. 17, 2018

(54) VEHICLE LIGHT CONTROLLER APPARATUSES, METHODS AND SYSTEMS

(71) Applicant: Barrie R. Briggs, Dale City, VA (US)

(72) Inventor: Barrie R. Briggs, Dale City, VA (US)

(73) Assignee: Barrie R. Briggs, Dale City, CA (US)

( * ) Notice: Subject to any disclaimer, the term of this patent is extended or adjusted under 35 U.S.C. 154(b) by 0 days.

(21) Appl. No.: 15/624,528

(22) Filed: Jun. 15, 2017

(51) Int. Cl.
*B60Q 1/04* (2006.01)
*H05B 37/02* (2006.01)
*B60Q 1/00* (2006.01)
*B60Q 1/30* (2006.01)
*B60Q 1/32* (2006.01)
*B60Q 1/56* (2006.01)

(52) U.S. Cl.
CPC ....... *H05B 37/0209* (2013.01); *B60Q 1/0094* (2013.01); *B60Q 1/04* (2013.01); *B60Q 1/30* (2013.01); *B60Q 1/32* (2013.01); *B60Q 1/56* (2013.01)

(58) Field of Classification Search
CPC ...... B60Q 1/0094; B60Q 1/04; B60Q 1/0408; B60Q 1/143; B60Q 1/30; B60Q 1/32; B60Q 2300/312; B60S 1/08
See application file for complete search history.

(56) References Cited

U.S. PATENT DOCUMENTS

| | | |
|---|---|---|
| 3,500,119 A | 3/1970 | Price |
| 3,500,120 A | 3/1970 | Schultz |
| 3,519,837 A | 7/1970 | Nolin et al. |
| 3,591,845 A | 7/1971 | Vanderpoel, Jr. |
| 3,824,405 A * | 7/1974 | Glaze ............ B60Q 1/143 307/10.8 |
| 4,337,400 A | 6/1982 | Hahn |
| 4,656,363 A | 4/1987 | Carter et al. |
| 4,985,660 A | 1/1991 | Cronk |
| 5,120,981 A | 6/1992 | Cope |
| 5,138,183 A * | 8/1992 | Patterson ......... B60Q 1/143 307/10.8 |
| 5,168,196 A | 12/1992 | Briggette et al. |
| 5,231,331 A | 7/1993 | Meister |
| 5,235,250 A | 8/1993 | Cronk |
| 5,444,307 A * | 8/1995 | Sheets ............ B60L 1/14 307/10.1 |
| 5,449,974 A | 9/1995 | Dunbar |
| 5,534,845 A | 7/1996 | Issa et al. |
| 5,592,146 A | 1/1997 | Kover, Jr. |
| 5,654,617 A | 8/1997 | Mills |
| 7,719,197 B2 | 5/2010 | Martin et al. |
| 7,825,534 B2 * | 11/2010 | Spear ............ B60Q 1/20 307/10.8 |

* cited by examiner

*Primary Examiner* — Thai Pham
(74) *Attorney, Agent, or Firm* — Irell & Manella, LLP

(57) ABSTRACT

The VEHICLE LIGHT CONTROLLER APPARATUSES, METHODS AND SYSTEMS include circuits for coupling lighting systems of a vehicle to controls for the windshield wipers. For example, when a vehicle operator engages the windshield wipers, vehicle lighting systems such as the headlights, tail lights, side markers, tag lights, and/or the like may be automatically engaged as well, without further user action. In some embodiments, the disclosed electronic circuitry may be configured as a kit suitable for retrofitting an existing vehicle system.

12 Claims, 6 Drawing Sheets

VEHICLE LIGHT CONTROLLER APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

Embodiments of the present innovations pertain to circuits for circuits for controlling lights, such as headlights, within vehicles such as automobiles, and more particularly include VEHICLE LIGHT CONTROLLER APPARATUSES, METHODS AND SYSTEMS ("VLC").

BACKGROUND

Vehicles, such as automobiles, include a variety of external lighting systems, including headlights, tail lights, tag lights, and the like. Such lighting systems may serve a variety of functions, such as improving visibility for the driver, providing alerts to pedestrians or other drivers, and otherwise providing for increased safety in the operation of the vehicle. Vehicles also frequently include windshield wiper systems, allowing a vehicle operator to clear rain or other material from the windshield from within the vehicle.

SUMMARY

In one aspect, embodiments of the disclosed apparatuses, methods and systems comprise electronic circuitry that couples lighting systems of a vehicle to controls for the windshield wipers. Thus, for example, when a vehicle operator engages the windshield wipers, vehicle lighting systems such as the headlights, tail lights, side markers, tag lights, and/or the like may be automatically engaged as well, without further user action. In one embodiment, the disclosed electronic circuitry may be configured as a kit suitable for retrofitting an existing vehicle system.

In one embodiment, an apparatus is disclosed, comprising: a semiconductor-controlled rectifier having a gate electrode, an anode, and a cathode, wherein the gate electrode is connected through a diode resistor to the windshield wiper motor of a vehicle, and the anode is connected through a piggyback fuse holder to a 5 amp ignition fuse holder in a fuse box of the vehicle; a relay having a first coil terminal, a second coil terminal, a high power feed, and a high power output, wherein the first coil terminal is connected to ground, the second coil terminal is connected to the cathode of the semiconductor-controlled rectifier, the high power feed is connected to a key-on-engine-running signal of a vehicle, and the high power output is connected through a diode resistor to at least one headlight of the vehicle.

BRIEF DESCRIPTION OF THE DRAWINGS

The accompanying appendices and/or drawings illustrate various non-limiting, example, innovative aspects in accordance with the present descriptions.

DETAILED DESCRIPTION

The VEHICLE LIGHT CONTROLLER APPARATUSES, METHODS AND SYSTEMS ("VLC") provide, in various embodiments, for automatic activation of vehicle lights in response to manual activation of the windshield wipers by an operator of the vehicle. In one embodiment, the VLC is configured to activate the vehicle headlights in response to activation of the windshield wipers. Such automatic activation of the headlights presents safety advantages, as it may improve visibility for a driver of the vehicle in adverse weather conditions such as rain, snow, fog, and the like. In various embodiments, other lights may be automatically activated in addition to or instead of the headlights, including the tail lights, tag lights, side markers, running lights, and/or the like and/or any combination thereof. In some embodiments, the VLC may be configured as a kit such as may be used to retrofit existing vehicles to allow for automatic activation of lights based on activation of the windshield wipers. In some implementations, the kit may receive power from the windshield wiper motor, the power being provided to one or more relays which power the headlights and/or other lights of the vehicle.

Figure 1B:
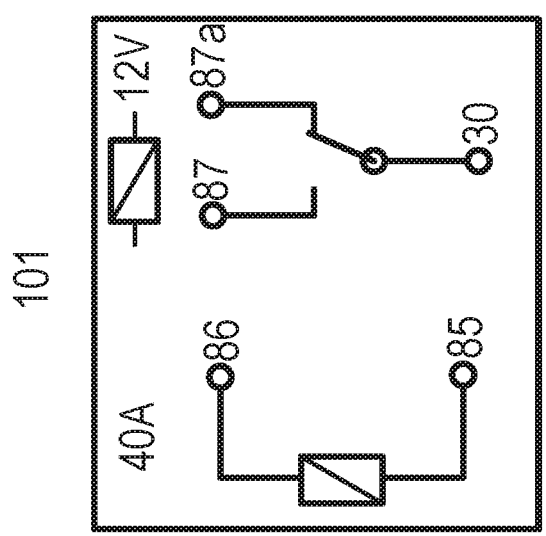
FIG. 1B shows a side view of a relay used in conjunction with the VLC in some embodiments.
Figure 1A:
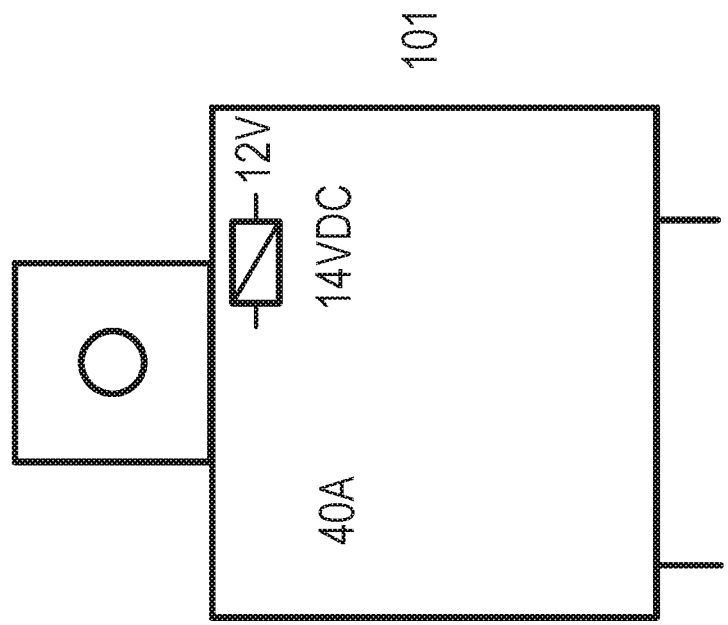
FIG. 1A shows a top view of a relay used in conjunction with the VLC in some embodiments.
Figure 1D:
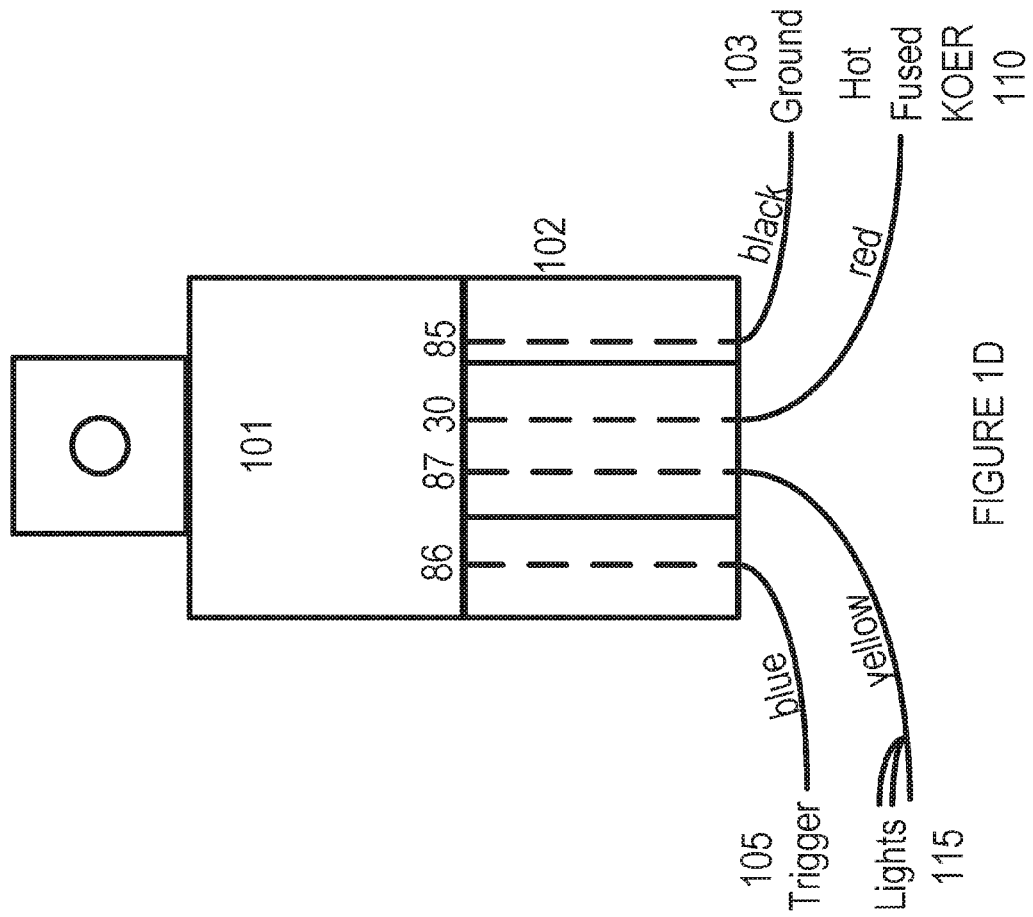
FIG. 1D shows connections of a relay used in conjunction with the VLC in some embodiments.
Figure 1C:
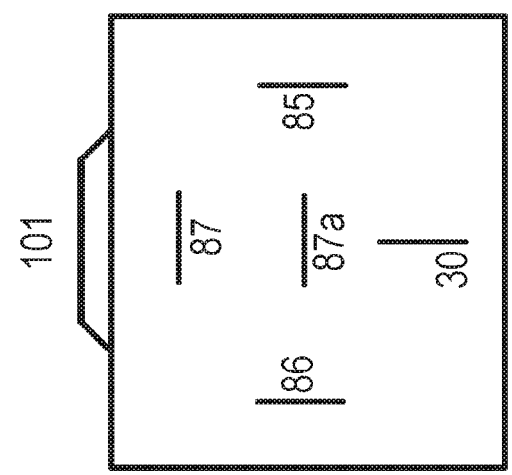
FIG. 1C shows a bottom view of a relay used in conjunction with the VLC in some embodiments.

FIGS. 1A, 1B and 1C show respectively a top view, side view and a bottom view of a relay 101 used in conjunction with the VLC in some embodiments. In one embodiment, the relay may be rated for 12 volts of potential and 40 amps of current. The relay may include various leads with which it may be connected to other components, the leads including, for example, a first coil terminal 85, a second coil terminal 86, a high power feed 30, a high power output 87, and/or the like. Examples of suitable relays include the Meishuo MAH-112-C3 relay.

FIG. 1D shows connections of a relay 101 used in conjunction with the VLC in some embodiments. The relay is connected to various other components via a relay connector (e.g., a socket, plug-in base, and/or the like) 102. In the illustrated embodiment, a first coil terminal 85 of the relay may be connected to a ground of the vehicle 103. In one implementation, this may include a common electrical ground shared by other components of the vehicle. In another implementation, this ground may comprise and/or be in electrical contact with a vehicle body, frame, chassis, and/or the like. In one embodiment, a second coil terminal 86 of the relay may be connected to a cathode of a rectifier component 105, such as a semiconductor controlled rectifier. In one embodiment, a high power feed 30 of the relay may be connected to a signal indicative of a running vehicle such as a hot-fused key-on-engine-running ("KOER") signal 110 of a vehicle, such as may be provided via the vehicle's diagnostic systems. In one embodiment, a high power output 87 of the relay may be connected to one or more lights of the vehicle 115, such as one or both headlights and/or auxiliary lights such as tag lights tail lights, side markers, running lights, and/or the like, and/or any combination thereof. In one implementation, the high power output 87 of the relay may be connected to the vehicle lights via at least one diode resistor.

Figure 2A:
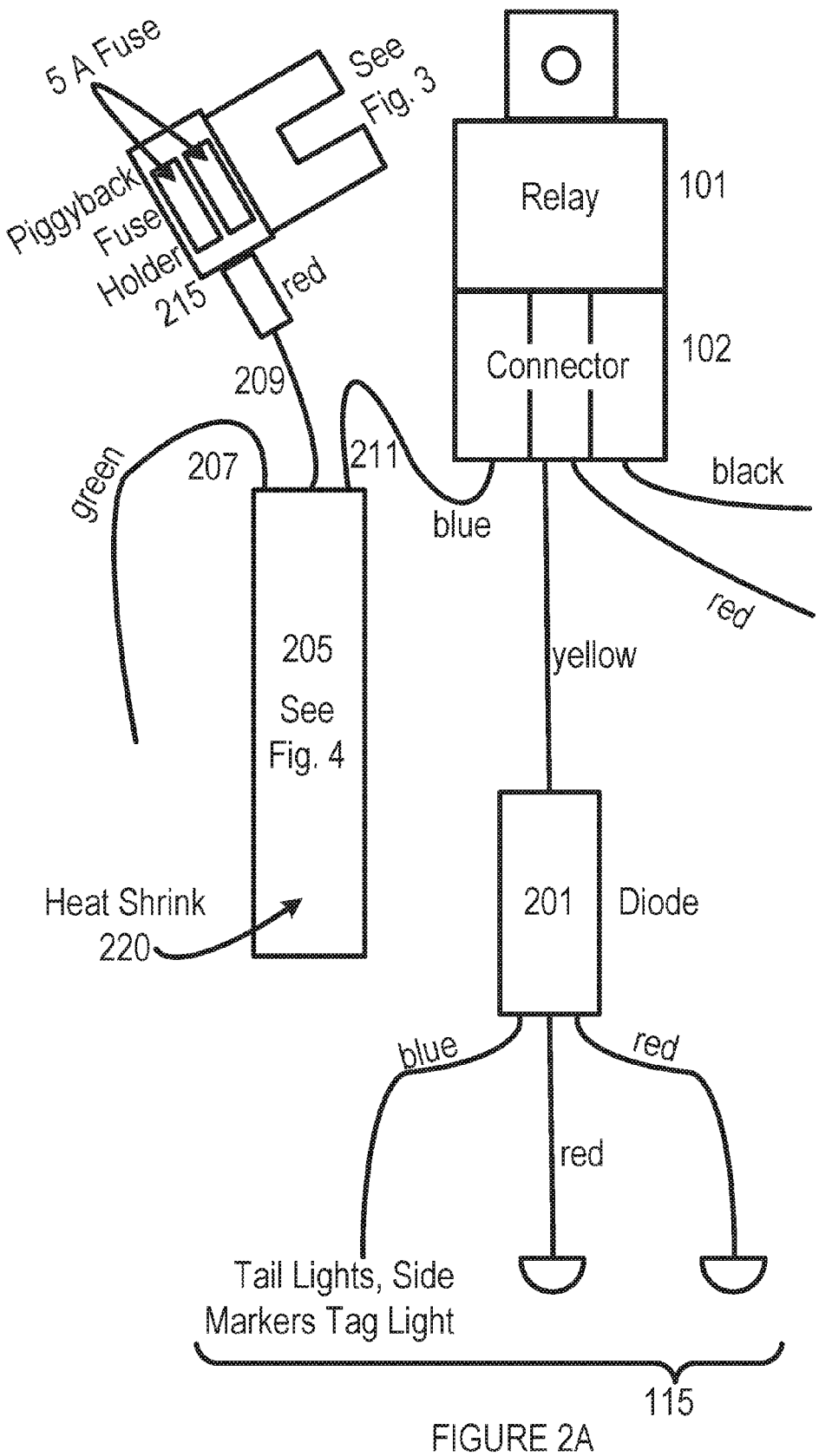
FIG. 2A shows aspects of a network of electrical components used in conjunction with the VLC in one embodiment.

FIG. 2A shows aspects of a network of electrical components used in conjunction with the VLC in some embodiments. The relay 101 illustrated and described in relation to FIGS. 1A-1D is shown connected to one or more vehicle lights 115. In an implementation, the relay may be connected to the vehicle lights through one or more diode components 201. The vehicle lights 115 that the relay 101 is connected to may include one or both headlights and/or any combination of auxiliary lights, including tail lights, side markers, tag lights, running lights, and/or the like. The relay 101 is also shown as connected to a rectifier component 205, such as a semiconductor controlled rectifier, as described below in relation to FIG. 4. In one implementation, the rectifier component may include a gate electrode 207, an anode 209, and a cathode 211, the relay connecting to the rectifier component via the cathode. The gate electrode of the rectifier component may be connected, e.g., via at least one diode resistor, to a windshield wiper motor of the vehicle. The anode of the rectifier component may be connected, e.g., through a piggyback fuse holder 215, to a 5 amp ignition fuse holder in a fuse box of the vehicle, as described in further detail below in relation to FIG. 3. In one implementation, the piggyback fuse holder corresponds to an ATO fuse while, in an alternative implementation, the piggyback fuse holder may correspond to a mini-blade fuse. When configured as a kit, the VLC may be provided with both mini-blade fuse and ATO fuse piggyback fuse holder options for a user to select from. In one implementation, the rectifier component may be encased in heat shrink tubing 220.

Figure 2B:
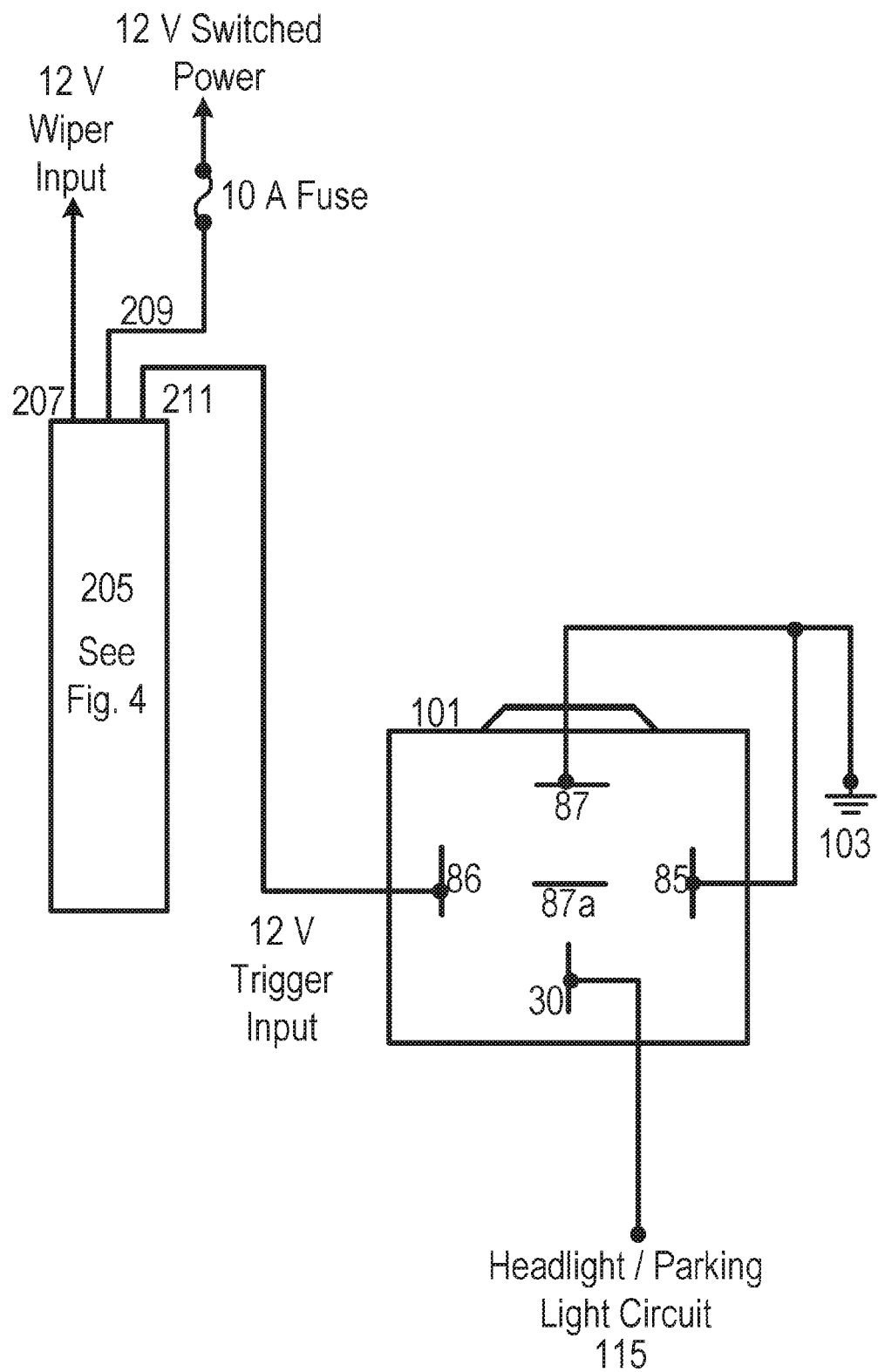
FIG. 2B shows aspects of a network of electrical components used in conjunction with the VLC in another embodiment.

FIG. 2B shows aspects of a network of electrical components used in conjunction with the VLC in some embodiments. The relay 101 illustrated and described in relation to FIGS. 1A-1D is shown connected to one or more vehicle lights 115. In an implementation, the relay may be connected to the vehicle lights via a high power feed 30 and/or through one or more diode components. The vehicle lights 115 that the relay 101 is connected to may include one or both headlights and/or any combination of auxiliary lights, including tail lights, side markers, tag lights, running lights, and/or the like. The relay 101 is also shown as connected via a second coil terminal 86 to a rectifier component 205, such as a semiconductor controlled rectifier, as described below in relation to FIG. 4. In one implementation, the rectifier component may include a gate electrode 207, an anode 209, and a cathode 211, the relay connecting to the rectifier component via the cathode. The gate electrode of the rectifier component may be connected, e.g., via at least one diode resistor, to a windshield wiper motor input of the vehicle. The anode of the rectifier component may be connected, e.g., through a 10 A fuse, to 12 V switched power. The relay 101 is also shown as connected at a first coil terminal 85 and a high power output 87 to a ground of the vehicle 103.

Figure 3:
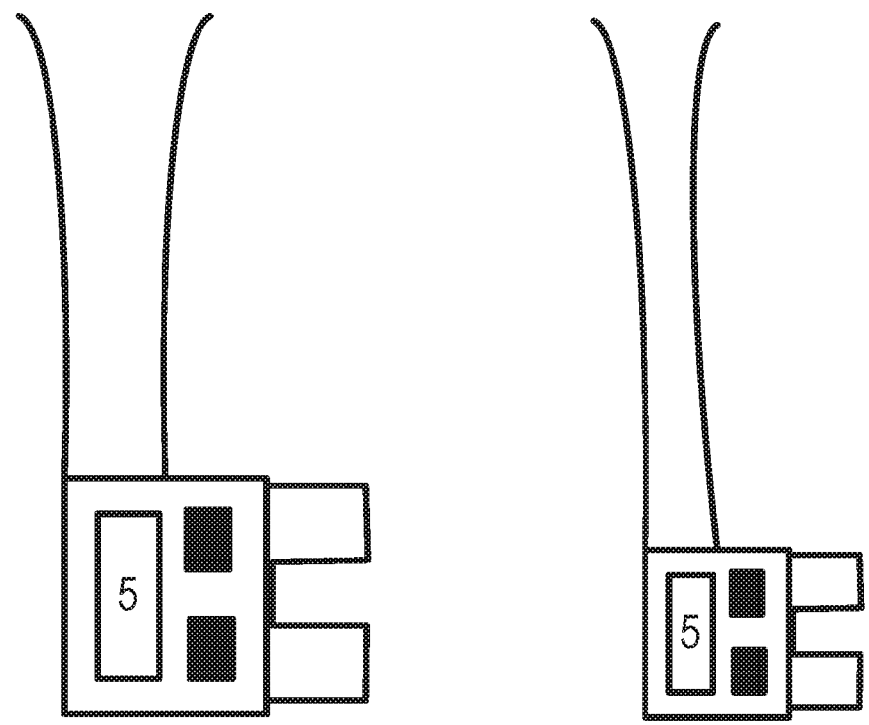
FIG. 3 illustrates aspects of fuses and a vehicle fuse block used in conjunction with the VLC in some embodiments.
Figure 3:
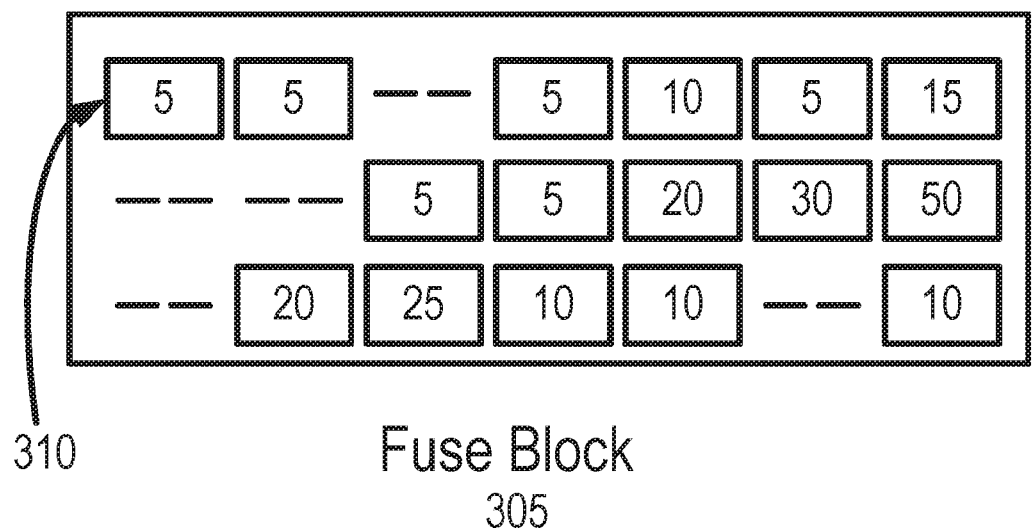

FIG. 3 illustrates aspects of piggyback fuse holders 215 and a vehicle fuse block 305 used in conjunction with the VLC in some embodiments. Various piggyback fuse holders 215 may be used in different embodiments and implementations of the VLC. For example, in some implementations, piggyback fuse holders configured for an ATO fuse 215a and/or a mini-blade fuse 215b may be employed, such as discussed above in relation to FIGS. 2A-2B. The selection of appropriate fuse and/or piggyback fuse holder type may depend, for example, on vehicle characteristics and components, such as the configuration of a vehicle fuse box 305. For example, piggyback fuse holders configured for ATO fuses 215a may be appropriate for older cars while piggyback fuse holders configured for mini-blade fuses 215b may be suitable for newer cars. In some embodiments wherein the VLC is configured as a kit, piggyback fuse holders for both ATO fuses 215a and mini-blade fuses 215b may be provided to allow a user to select an appropriate holder for a specific vehicle. The fuse block 305 illustrated in FIG. 3 is shown as including holders for various fuses, with numbers indicating the amperage rating for the fuse installed in each holder. To install the VLC, an existing 5 amp fuse (e.g., 310) may be removed from a 12 volt ignition fuse holder in the fuse box of the vehicle. The piggyback fuse holder, equipped with two 5 amp fuses, may then be inserted into the open 12 volt ignition fuse holder of the vehicle fuse box.

Figure 4:
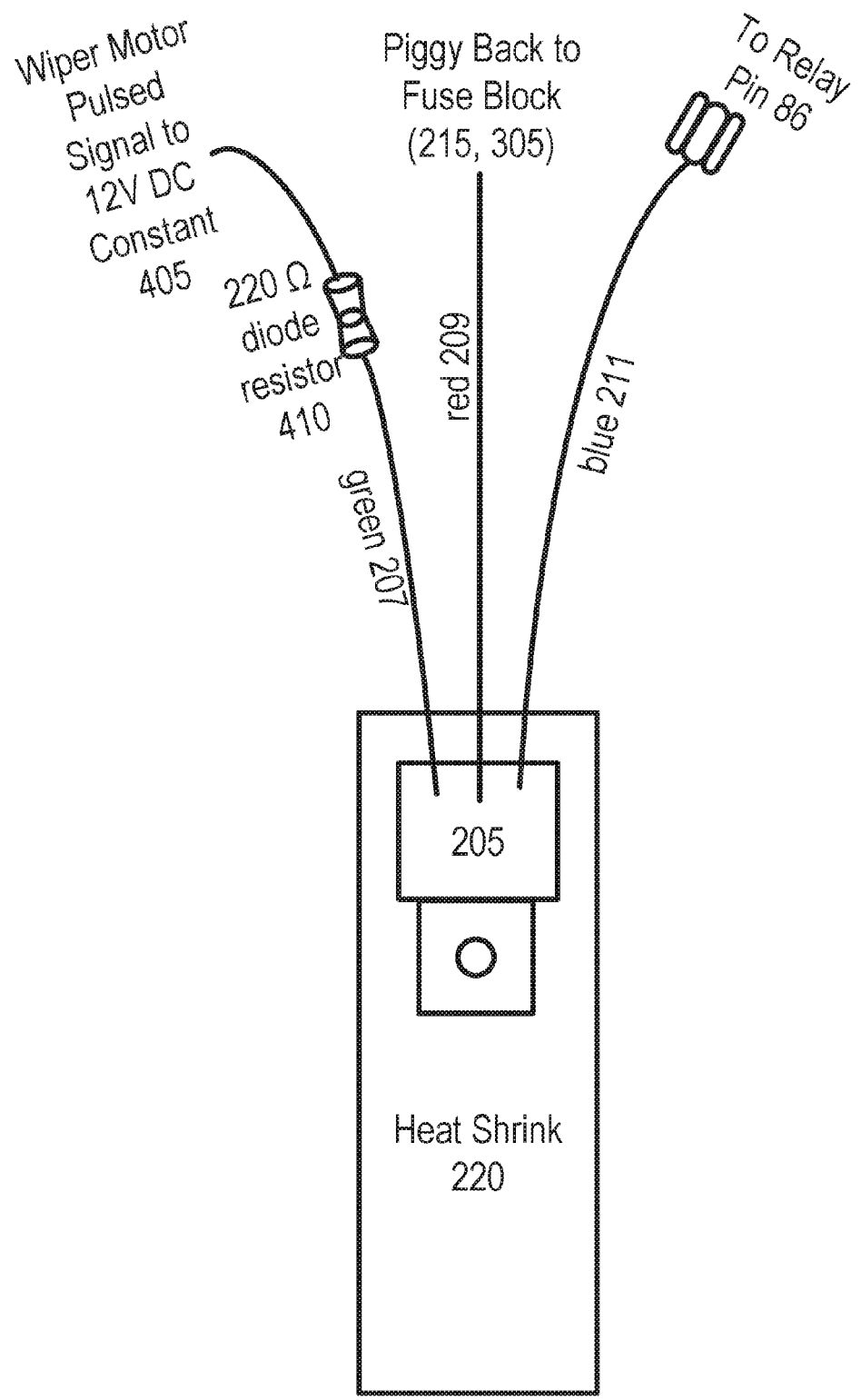
FIG. 4 shows connections of a rectifier used in conjunction with the VLC in some embodiments.

FIG. 4 shows connections of a rectifier used in conjunction with the VLC in some embodiments. The rectifier shown in the embodiment of FIG. 4 is a silicon controlled rectifier. In one implementation, the rectifier may be rated for 8 amps and 400 volts. In one implementation, the rectifier may be a Bourns TIC116D rectifier. The rectifier may include a gate electrode 207 connected to the windshield wiper motor 405 of the vehicle. In one implementation, the gate electrode 207 is connected to the windshield wiper motor 405 via at least one diode resistor 410, such as a 220 Ω diode resistor. The rectifier may also include an anode 209 connected through a piggyback fuse holder 215 to a fuse block 305 of the vehicle, such as discussed above in relation to FIG. 3. The rectifier may also include a cathode 211 connected to a second coil terminal 86 of a relay 101 such as discussed above in relation to FIGS. 1A-1D. In one implementation, the rectifier 205 may be encased in heat shrink tubing 220.

In order to address various issues and advance the art, the entirety of this application for VEHICLE LIGHT CONTROLLER APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further un-described alternate embodiments may be available for a portion is not to be considered a disclaimer of those alternate embodiments. It will be appreciated that many of those un-described embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

The invention claimed is:

1. An apparatus electronic circuit coupled to lighting systems of a vehicle, the electronic circuit comprising:
   a semiconductor-controlled rectifier having a gate electrode, an anode, and a cathode, wherein the gate electrode is connected through at least one of a diode and a resistor to a windshield wiper motor of a vehicle, and the anode is connected through a piggyback fuse holder to an ignition fuse holder in a fuse box of the vehicle;
   a relay having a first coil terminal, a second coil terminal, a high power feed, and a high power output, wherein the first coil terminal is connected to ground, the second coil terminal is connected to the cathode of the semiconductor-controlled rectifier, the high power feed is connected to a key-on-engine-running signal of a vehicle, and the high power output is connected through a diode to at least one headlight of the vehicle.

2. The electronic circuit of claim 1, wherein the high power output is connected through at least one of a diode and a resistor to two headlights of the vehicle.

3. The apparatus electronic circuit of claim 1, wherein the high power output is also connected through the diode to at least one auxiliary vehicle light.

4. The electronic circuit of claim 3, wherein the auxiliary vehicle light comprises a tail light.

5. The electronic circuit of claim 3, wherein the auxiliary vehicle light comprises a side marker light.

6. The electronic circuit of claim 3, wherein the auxiliary vehicle light comprises a tag light.

7. The electronic circuit of claim 1, wherein the relay is rated for 12 volts and 40 amps.

8. The electronic circuit of claim 1, wherein the semiconductor-controlled rectifier is a silicon-controlled rectifier.

9. The electronic circuit of claim 1, wherein the semiconductor-controlled rectifier is wrapped in heat shrink tubing.

10. The electronic circuit of claim 1, wherein the piggyback fuse holder corresponds to an Automatic Throw Over fuse.

11. The electronic circuit of claim 1, wherein the piggyback fuse holder corresponds to a mini-blade fuse.

12. The electronic circuit of claim 1, wherein the ignition fuse holder in the fuse box of the vehicle is a 5 Amp ignition fuse holder.

* * * * *